(12) United States Patent
Lin et al.

(10) Patent No.: US 12,162,333 B2
(45) Date of Patent: Dec. 10, 2024

(54) ELECTRIC LIFT GATE AND VEHICLE

(71) Applicant: WINBO-DONGJIAN AUTOMOTIVE TECHNOLOGY CO., LTD., Foshan (CN)

(72) Inventors: Guowei Lin, Foshan (CN); Wenhua Guan, Foshan (CN); Weiting He, Foshan (CN); Jie Yang, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 479 days.

(21) Appl. No.: 17/517,757

(22) Filed: Nov. 3, 2021

(65) Prior Publication Data

US 2022/0134851 A1    May 5, 2022

(30) Foreign Application Priority Data

Nov. 3, 2020 (CN) .......................... 202011208122.1

(51) Int. Cl.
*E05F 15/60* (2015.01)
*B60J 5/08* (2006.01)
*E05F 15/603* (2015.01)

(52) U.S. Cl.
CPC ............... *B60J 5/08* (2013.01); *E05F 15/603* (2015.01); *E05Y 2201/434* (2013.01); *E05Y 2900/53* (2013.01)

(58) Field of Classification Search
CPC ....... B60J 5/08; B60J 7/14; B60J 5/065; B60J 7/085; B60J 7/08; E05F 15/603; E05F 2201/434; E05F 2900/53; B60R 5/04
See application file for complete search history.

(56) References Cited

U.S. PATENT DOCUMENTS

| | | | | |
|---|---|---|---|---|
| 4,452,292 A * | 6/1984 | Leivenzon | ............ | H02H 7/0859 |
| | | | | 160/133 |
| 4,717,196 A * | 1/1988 | Adams | ........................ | B60J 5/14 |
| | | | | 296/100.09 |
| 4,792,178 A * | 12/1988 | Kokx | ........................ | B60J 7/068 |
| | | | | 296/100.18 |
| 5,203,392 A * | 4/1993 | Shea | .......................... | E06B 9/74 |
| | | | | 160/310 |
| 6,085,825 A * | 7/2000 | Swink | ...................... | E05F 15/67 |
| | | | | 160/133 |
| 11,884,145 B2 * | 1/2024 | Pompili | ................... | B60R 5/048 |
| 2004/0107712 A1* | 6/2004 | Moran | .................... | B60P 3/205 |
| | | | | 62/177 |

(Continued)

*Primary Examiner* — Beth A Stephan
(74) *Attorney, Agent, or Firm* — Taft Stettinius & Hollister LLP (57) ABSTRACT

The present disclosure relates to an electric lift gate and a vehicle. The electric lift gate includes: two side bars opposed and spaced apart, and the two side bars being provided with a guiding groove, respectively, the guiding groove extending along a length direction of the side bar; a roller shutter assembly disposed between the two side bars, two opposite sides of the roller shutter assembly being slidably disposed in the corresponding guiding grooves, respectively; a winding assembly cooperating with the roller shutter assembly in a driving manner; and a driving assembly connected to the winding assembly, and configured to drive the winding assembly to rotate, so as to drive the roller shutter assembly to wind or unwind.

7 Claims, 6 Drawing Sheets

(56) References Cited

U.S. PATENT DOCUMENTS

| | | | |
|---|---|---|---|
| 2005/0284402 A1* | 12/2005 | Becker | E06B 7/32 |
| | | | 119/484 |
| 2016/0222720 A1* | 8/2016 | Tamberino | E06B 7/30 |
| 2017/0328126 A1* | 11/2017 | Bonge, Jr. | E06B 9/15 |
| 2018/0001750 A1* | 1/2018 | Miller | B60P 3/205 |
| 2020/0071974 A1* | 3/2020 | Burns | E06B 9/15 |
| 2020/0355015 A1* | 11/2020 | Cate | G05B 15/02 |
| 2022/0118833 A1* | 4/2022 | Bennett | E06B 9/13 |

* cited by examiner

ELECTRIC LIFT GATE AND VEHICLE

CROSS REFERENCE TO RELATED APPLICATION

This application claims the benefit of Chinese Patent Application No. 2020112081221, filed on Nov. 3, 2020, the entire content of which is incorporated herein in its entirety.

TECHNICAL FIELD

The present disclosure relates to the technical field of vehicle accessory, and in particularly, relates to an electric lift gate and a vehicle.

BACKGROUND

For some vehicles with an open-type trunk, such as pick-ups, or trucks, a lift gate is usually mounted on the trunk of the vehicle. The lift gate can protect the safety of cargo in the trunk, protect the cargo from rainwater, and the like. At present, most of the lift gates on the market are manual types, which require manpower to open and close through a drawstring, which is time-consuming and labor-intensive and very inconvenient to use.

SUMMARY

According to various embodiments of the present disclosure, an electric lift gate and a vehicle are provided.

An electric lift gate includes:
two side bars opposed and spaced apart, the two side bars being provided with a guiding groove, respectively, the guiding groove extending along a length direction of the side bar;
a roller shutter assembly disposed between the two side bars, two opposite sides of the roller shutter assembly being slidably disposed in the corresponding guiding grooves, respectively;
a winding assembly cooperating with the roller shutter assembly in a driving manner; and
a driving assembly connected to the winding assembly, and configured to drive the winding assembly to rotate, so as to drive the roller shutter assembly to wind or unwind.

The above electric lift gate is mounted on a trunk of to vehicle. The two side bars can be respectively mounted on opposite sides of the trunk in a width direction. The roller shutter assembly has certain flexibility and thus can be automatically wound or unwound under the cooperation of the winding assembly and the driving assembly. For example, in an initial state, the roller shutter assembly is in an unwound state and covers an opening of the trunk, so as to well safely protect the cargo in the trunk. When the electric lift gate is required to be opened, the winding assembly is driven to rotate by the driving assembly, such that the roller shutter assembly can be driven to move toward a side where the winding assembly is located along the guiding groove and then be wound, thereby automatically opening the electric lift gate. When the electric lift gate is required to be closed, the winding assembly is driven to rotate in a reverse direction by the driving assembly, such that the roller shutter assembly can be driven to move away from the side where the winding assembly is located along the guiding groove and then be unwound, thereby automatically closing the trunk. The electric lift gate of this scheme can realize automatic opening and closing, saving time and effort, which can effectively improve the use convenience of the electric lift gate.

In one of the embodiments, the electric lift gate further includes a storage box. The storage box includes two side plates that are opposed and spaced apart. The side plates are connected to the side bars in a one-to-one correspondence. The winding assembly includes a connecting rod and rotating members respectively disposed at two opposite ends of the connecting rod. Each of the rotating members is rotatably connected to the corresponding side plate. The driving assembly is connected to one of the rotating members.

In one of the embodiments, the winding assembly further includes a transmission gear connected to the connecting rod. The transmission gear is capable of rotating synchronously with the connecting rod. The roller shutter assembly includes a plurality of shutters movably connected in sequence along the length direction of the side bar. Each of the shutters is provided with a tooth portion meshing with the transmission gear.

In one of the embodiments, the two opposite ends of the connecting rod are sleeved with the transmission gear, respectively. The transmission gear is rigidly connected to the connecting rod. Two opposite end surfaces of the connecting rod are provided with an inserting hole, respectively. The rotating member includes a driving shaft connected to the driving assembly, a rotating shaft rotatably mounted on the side plate, a fixed disk abutting against an end surface of the transmission gear and being locked and fixed through fasteners, and an inserting portion disposed on a side of the fixed disk away from the rotating shaft and inserted into the inserting hole. The driving shaft and the fixed disk are disposed at two opposite ends of the rotating shaft, respectively.

In one of the embodiments, surfaces of the two side plates that are opposed are respectively provided with a spiral groove. An end of the spiral groove is in communication with the guiding groove. The roller shutter assembly is capable of spirally entering or exiting the storage box along the spiral groove.

In one of the embodiments, a top of the storage box is open. The electric lift gate further includes a cover plate disposed at an open end of the storage box. An opening for the roller shutter assembly to enter and exit is formed between the cover plate and the storage box.

In one of the embodiments, the cover plate is provided with a brush at an edge corresponding to the opening.

In one of the embodiments, the electric lift gate further includes an ECU control module. One of the side bars is provided with two limit switches spaced apart along the length direction thereof. Each of the limit switches and the driving assembly are electrically connected to the ECU control module, respectively. When the roller shutter assembly is wound or unwound in place, the limit switch is capable of being triggered. The ECU control module controls the driving assembly to stop driving according to a signal fed back from the limit switch.

In one of the embodiments, the driving assembly includes a driving motor and a decelerator. The driving motor is connected to the winding assembly through the decelerator. The decelerator is provided with a clutch wrench. The clutch wrench is configured to control a clutch state of the decelerator.

The present application further provides a vehicle, which includes the electric lift gate as described above.

BRIEF DESCRIPTION OF THE DRAWINGS

The drawings forming a part of this disclosure are used to provide a further understanding of the present disclosure.

Schematic embodiments and descriptions thereof in the present disclosure are used to explain the present disclosure and do not form an undue limitation on the present disclosure.

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the above objects, features and advantages of the present disclosure more obvious and understandable, the specific embodiments of the present disclosure will be illustrated in detail below in conjunctions with the accompanying drawings. In the following description, many specific details are set forth in order to assist readers in fully understanding the present disclosure. However, the present disclosure can be implemented in many other ways than described herein, and those skilled in the art can make similar improvements without departing from the connotation of the present disclosure. Therefore, the present disclosure is not limited by the specific embodiments disclosed below.

Referring to FIGS. 1 to 5, an electric lift gate according to an embodiment of the present disclosure includes two side bars 10, a roller shutter assembly 20, a winding assembly 30, and a driving assembly 40. The two side bars 10 are opposed and spaced apart. The two side bars 10 are provided with a guiding groove 11, respectively. The guiding groove 11 extends along a length direction of the side bar 10. The roller shutter assembly 20 is disposed between the two side bars 10. Two opposite sides of the roller shutter assembly 20 are slidably disposed in the corresponding guiding grooves 11, respectively. The winding assembly 30 cooperates with the roller shutter assembly 20 in a driving manner. The driving assembly 40 is connected to the winding assembly 30. The driving assembly 40 is used for driving the winding assembly 30 to rotate, so as to drive the roller shutter assembly 20 to wind or unwind.

The above-mentioned electric lift gate is used to be mounted on a trunk of a vehicle. The two side bars 10 can be mounted on two opposite sides of the trunk in a width direction, respectively. The roller shutter assembly 20 has certain flexibility and thus can be automatically wound or unwound under the cooperation of the winding assembly 30 and the driving assembly 40. For example, in an initial state, the roller shutter assembly 20 is in an unwound state and covers an opening of the trunk, so that well safety protection effect on the cargo in the trunk can be achieved. When the electric lift gate is required to be opened, the winding assembly 30 is driven to rotate by the driving assembly 40, such that the roller shutter assembly 20 can be driven to move toward a side where the winding assembly 30 is located along the guiding groove 11 and then be wound, thereby automatically opening the electric lift gate. When the electric lift gate is required to be closed, the winding assembly 30 is driven to rotate in a reverse direction by the driving assembly 40, such that the roller shutter assembly 20 can be driven to move away from the side where the winding assembly 30 is located along the guiding groove 11 and then be unwound, thereby automatically closing the trunk. The electric lift gate can realize automatic opening and closing, saving time and effort, which can effectively improve the use convenience of the electric lift gate.

Figure 2:
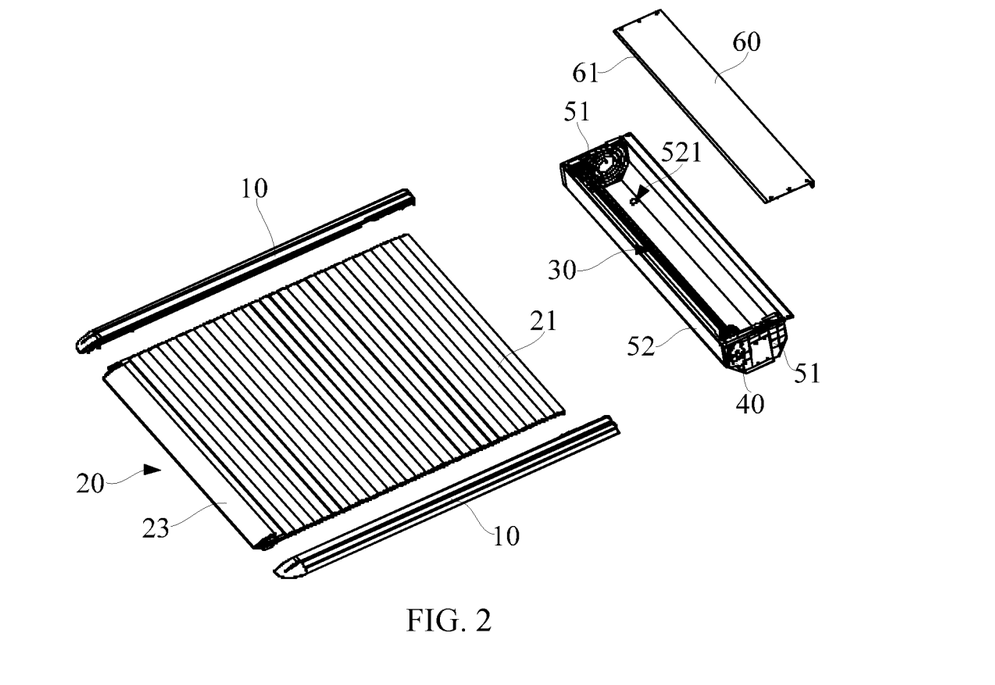
FIG. 2 is an exploded view of the electric lift gate shown in FIG. 1.
Figure 3:
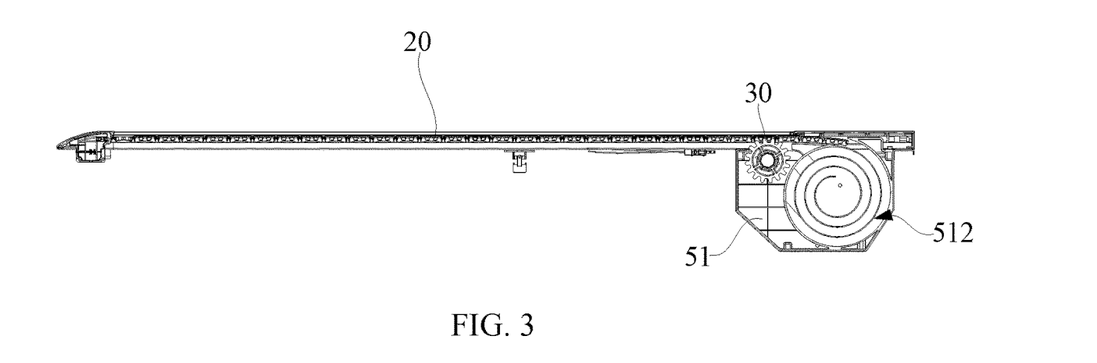
FIG. 3 is a schematic view of a roller shutter assembly of the electric lift gate shown in FIG. 1 in an unwound state.
Figure 6:
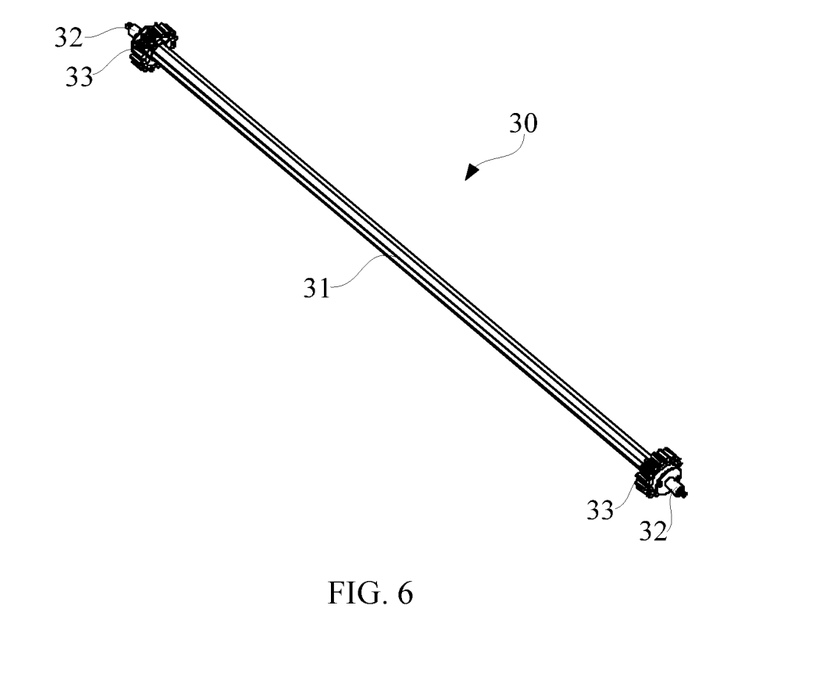
FIG. 6 is a schematic view of a winding assembly.

Further, referring to FIGS. 2 and 6, in this embodiment, the electric lift gate further includes a storage box 50. The storage box 50 includes two side plates 51 that are opposed and spaced apart. The side plates 51 are connected to the side bars 10 in a one-to-one correspondence. The winding assembly 30 includes a connecting rod 31 and rotating members 32 respectively disposed at two opposite ends of the connecting rod 31. Each of the rotating members 32 is rotatably connected to the corresponding side plate 51, respectively. The driving assembly 40 is connected to one of the rotating members 32. Specifically, the storage box 50 is disposed at the same end of the two side bars 10. For example, the storage box 50 can be disposed at ends of the two side bars 10 adjacent to the head of the vehicle. The storage box 50 includes a box casing 52 and two side plates 51. The box casing 52 can be formed into a groove-like structure by using sheet metal parts. For example, a U-shaped groove-like structure can be formed by a bending process using an aluminum alloy of about 2.0 mm. The side plates 51 can be injection molded from nylon and glass fiber. The two side plates 51 are fixed at sides where two opposite openings of the box casing 52 are located, respectively. The winding assembly 30 can be mounted and fixed by the two side plates 51. The driving assembly 40 drives the rotating member 32 to rotate, so that the winding assembly 30 can be rotated, and thus the roller shutter assembly 20 can be driven to wind or unwind. Moreover, the roller shutter assembly 20 can be housed in the storage box 50 when being in a winding state, such that the overall structure thereof is compact and occupies little space. Optionally, a drain hole 521 is further provided at a bottom of the box casing 52, which can be used to mount a drain pipe, so that accumulated water in the storage box 50 can be quickly discharged.

Figure 1:
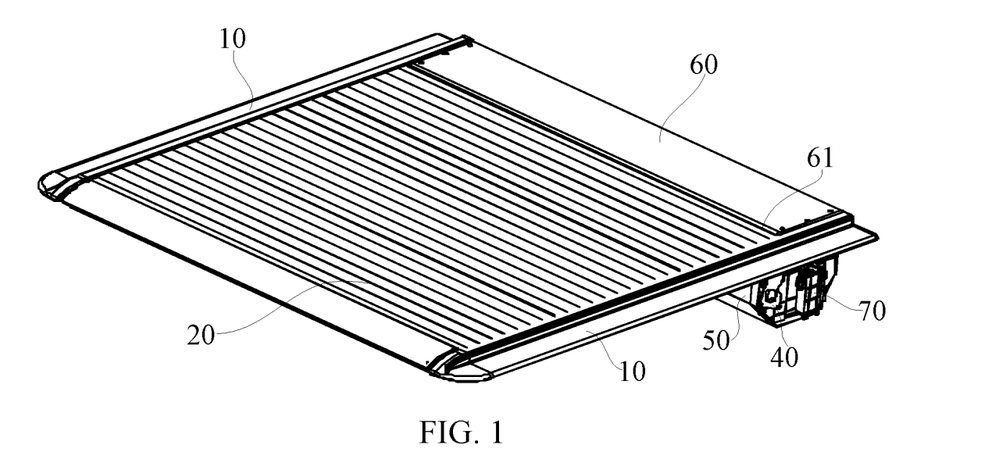
FIG. 1 is a schematic view of an electric lift gate according to an embodiment of the present disclosure.

Further, in this embodiment, the driving assembly 40 is mounted at an outer side of one of the side plates 51. Specifically, a mounting groove may be provided on the outer side of one of the side plates 51, the driving assembly 40 is fixed in the mounting groove. A driving end of the driving assembly 40 extends into an inner side of the side plate 51 to be connected to the rotating member 32 in a driving manner. In this way, it is possible to well prevent rainwater from entering the storage box 50 and soaking the driving assembly 40, thereby avoiding product failure. Similarly, an electronic control unit (ECU) control module 70 of the electric lift gate can also be mounted on the outer side of one of the side plates 51, which can greatly reduce the waterproof requirements of the driving assembly 40 and the ECU control module 70, thereby saving costs. Both the driving assembly 40 and the ECU control module 70 can be mounted on the outer side of the same side plate 51. For example, as shown in FIG. 1, in this embodiment, the outer side of the side plate 51 on the right side is designed with a mounting groove for mounting the driving assembly 40 and the ECU control module 70, respectively. Of course, the driving assembly 40 and the ECU control module 70 can also be mounted on the outer sides of different side plates 51, respectively.

Figure 4:
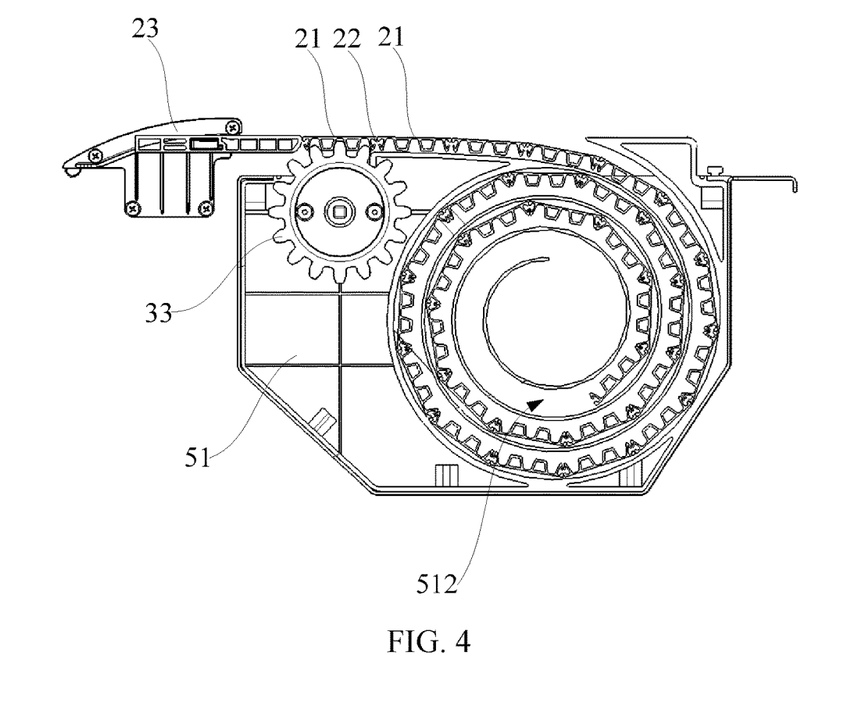
FIG. 4 is a schematic view of a roller shutter assembly of the electric lift gate shown in FIG. 1 in a wound state.
Figure 9:
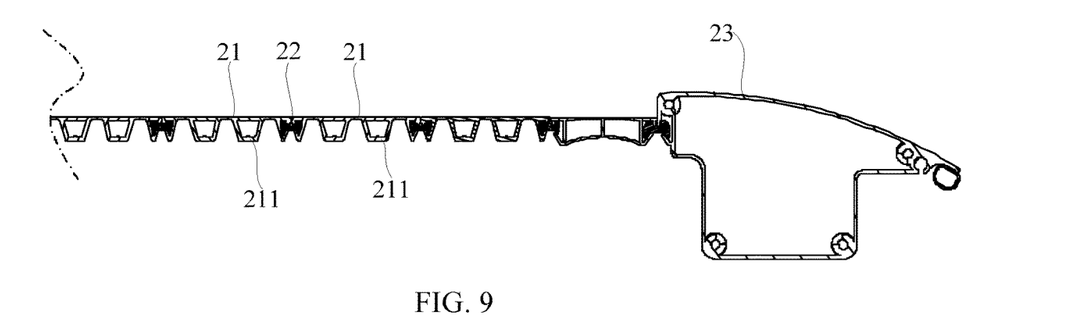
FIG. 9 is a partial cross-sectional schematic view of the roller shutter assembly.

Further, referring to FIGS. 4 and 9, in this embodiment, the winding assembly 30 further includes a transmission gear 33 connected to the connecting rod 31. The transmission gear 33 can rotate synchronously with the connecting rod 31. The roller shutter assembly 20 includes a plurality of shutters 21. The plurality of shutters 21 are movably connected in sequence along the length direction of the side bar 10. Each of the shutters 21 is provided with a tooth portion 211 meshing with the transmission gear 33. Specifically, the shutter 21 has a tooth-like structure. The shutter 21 is provided with the tooth portion 211 at a bottom surface thereof. When the roller shutter assembly 20 is in the unwound state, the plurality of shutters 21 are combined to form a long rack, which meshes with the transmission gear 33 on the connecting rod 31. When the connecting rod 31 rotates, the transmission gear 33 can be driven to rotate, and thus the shutters 21 can be driven to wind or unwind. A gear transmission structure is formed between the shutters 21 and the transmission gear 33, which is reliable in transmission and has a large driving force, which can ensure that the roller shutter assembly 20 can be wound or unwound in place.

Further, as shown in FIG. 9, in this embodiment, two adjacent shutters 21 are movably connected by a waterproof rubber strip 22. The waterproof rubber strip 22 can be made of a rubber material with strong twisting performance. When the electric lift gate is closed, the roller shutter assembly 20 is in the unwound state, the shutters 21 and the waterproof rubber strips 22 extend straight, and laid flat in the guiding grooves 11 of the two side bars 10. The waterproof rubber strips 22 are in a normal tightening state. Therefore, it is possible to well prevent external rainwater from infiltrating into the trunk through gaps between the shutters 21. When the electric lift gate is opened, the roller shutter assembly 20 is in the wound state, the shutters 21 and the waterproof rubber strips 22 are brought into and housed in the storage box 50 through the transmission gear 33. In this case, the waterproof rubber strips 22 are in a twisted state to ensure that the shutters 21 can be smoothly rolled and housed while the shutters 21 is firmly connected. Further, in this embodiment, the roller shutter assembly 20 further includes a shutter end 23 movably connected to the shutter 21 located on the foremost side.

Figure 10:
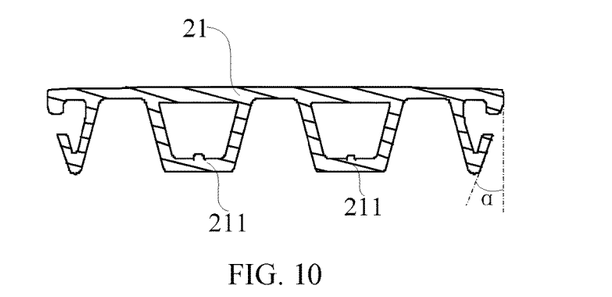
FIG. 10 is a schematic view of one of shutters of the roller shutter assembly.

In order to further ensure that the shutters 21 can be rolled and closed well, optionally, edges of the shutters 21 are provided at an angle with a vertical direction. For example, as shown in FIG. 10, the angle between the edge of the shutter 21 and the vertical direction is α. The angle α may be in a range of 15° to 25°. Preferably, the angle α is 20°, which can well ensure the rolling and closing between the shutters 21. In addition, a volume of the shutters 21 after being rolled and closed is small, thereby reducing the volume of the storage box 50 and ensuring that the shutters 21 is wound and unwound smoothly.

The number of tooth portion 211 on each shutter 21, the number of teeth, modulus, tooth height, tooth pitch, and the like of the transmission gear 33, and the angle between the edge of the shutter and the vertical direction, and other parameters, can be adjusted adaptively based on a size of the trunk of the vehicle, a closing speed of the electric lift gate, and the like.

Figure 7:
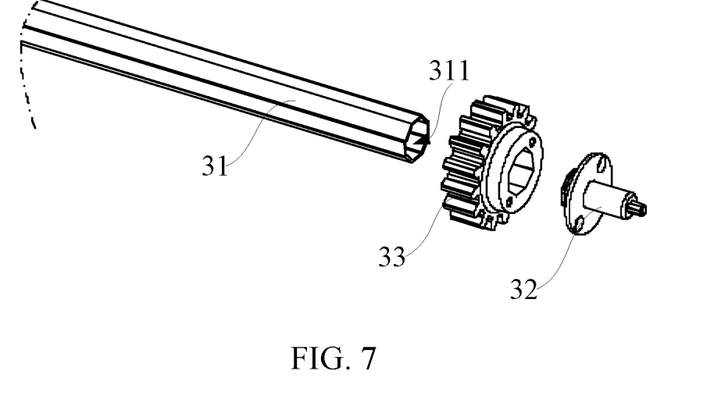
FIG. 7 is a partial exploded view of the winding assembly shown in FIG. 6.
Figure 8:
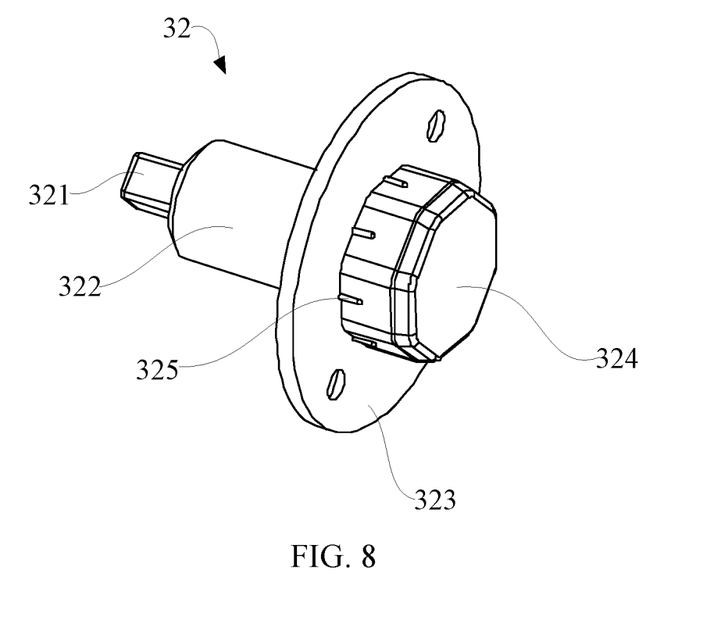
FIG. 8 is a schematic view of a rotating member of the winding assembly shown in FIG. 6.

Referring to FIGS. 6 to 8, in order to further improve the stability of the product, in this embodiment, the two opposite ends of the connecting rod 31 are sleeved with the transmission gear 33, respectively. The transmission gear 33 is rigidly connected to the connecting rod 31. Two opposite end surfaces of the connecting rod 31 are provided with an inserting hole 311, respectively. The rotating member 32 includes a driving shaft 321, a rotating shaft 322, a fixed disk 323, and an inserting portion 324. The driving shaft 321 and the fixed disk 323 are respectively disposed at two opposite ends of the rotating shaft 322. The inserting portion 324 is disposed on a side of the fixed disk 323 away from the rotating shaft 322. The driving shaft 321 is connected to the driving assembly 40. The rotating shaft 322 is rotatably mounted on the side plate 51. The inserting portion 324 is inserted into the inserting hole 311. The fixed disk 323 abuts against an end surface of the transmission gear 33 and is locked and fixed through fasteners. The overall assembling structure of the winding assembly 30 is simple, and is stable and reliable, which can well ensure the coaxiality of the two transmission gears 33, effectively solve a problem of the two transmission gears 33 being out of synchronization, and greatly improve the stability of the product.

In order to further ensure the coaxiality and improve the stability, optionally, the inserting hole 311 is a polygonal hole. The inserting portion 324 is a polygonal structure adapted to the inserting hole 311. Optionally, splines 325 are provided on a peripheral surface of the inserting portion 324. Specifically, the connecting rod 31 may be a polygonal prism structure. For example, in this embodiment, the connecting rod 31 is a hollow regular hexagonal prism structure. The inserting hole 311 is formed to be a regular hexagonal hole in the connecting rod 31. The transmission gear 33 is provided with a regular hexagonal hole adapted to an outer diameter of the connecting rod 31 at the middle thereof. The rotating member 32 has a regular hexagonal inserting portion 324 adapted to an inner diameter of the connecting rod 31. The splines 325 are disposed on the periphery of the inserting portion 324. During assembly, the transmission gear 33 is sleeved on the connecting rod 31, and the inserting portion 324 of the rotating member 32 is pressed into the connecting rod 31 by means of hydraulic pressure or stamping to form a rigid connection. Then, the fixed disk 323 of the rotating member 32 is locked and fixed to the end surface of the transmission gear 33 by the fasteners (such as screws or bolts). In addition, since the shutter 21 is usually made of plastic, in order to avoid the shutter 21 from being worn during the rotation of the transmission gear 33, the transmission gear 33 may be a plastic gear.

Figure 11:
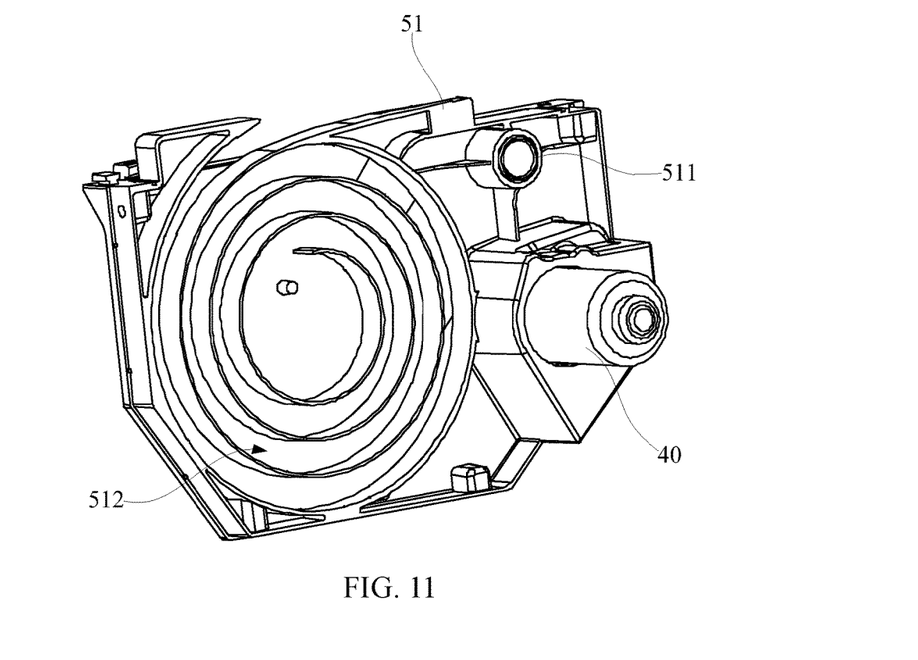
FIG. 11 is a schematic view of one of side plates of a storage box.

In addition, in order to ensure smoother rotation of the rotating member 32, further, in this embodiment, the side plate 51 is provided with a shaft sleeve 511 or a bearing that cooperates with the rotating shaft 322. For example, as shown in FIG. 11, in this embodiment, the two side plates 51 may be provided with a shaft sleeve 511 at corresponding positions thereof, respectively. The rotating shaft 322 may be rotatably inserted into the shaft sleeve 511. This not only can ensure that the rotating shaft 322 rotates more smoothly, but also avoid the rotating shaft 322 from being worn. The shaft sleeve 511 can be a copper sleeve.

Further, referring to FIGS. 4 and 11, in this embodiment, surfaces of the two side plates 51 that are opposed are respectively provided with a spiral groove 512. An end of the spiral groove 512 is in communication with the guiding groove 11. The roller shutter assembly 20 can spirally enter or exit the storage box 50 along the spiral groove 512. By symmetrically designing the spiral grooves 512 on the two side plates 51, the shutters 21 of the roller shutter assembly 20 can be wound under a guidance of the spiral grooves 512, so that the roller shutter assembly 20 can be uniformly rolled. The spiral groove 512 is disposed such that the friction of the roller shutter assembly 20 itself when it is rolled can be eliminated, and can provide the guidance for the roller shutter assembly 20 to enter and exit, which greatly improves the closing smoothness of the roller shutter assembly 20 and can effectively reduce the closing noise.

Further, as shown in FIG. 1, in this embodiment, a top of the storage box 50 is open. The electric lift gate further includes a cover plate 60 disposed at an open end of the storage box 50. An opening for the roller shutter assembly 20 to enter and exit is formed between the cover plate 60 and the storage box 50. Through the cooperation of the storage box 50 and the cover plate 60, a relatively closed storage space can be provided for the winding assembly 30 and the roller shutter assembly 20, which can prevent dust and rainwater from entering and play a good protective effect. The cover plate 60 can be made of metal or plastic material. For example, in this embodiment, the cover plate 60 is made of aluminum material. The cover plate 60 is fixed on tops of the two side bars 10.

Further, in this embodiment, the cover plate 60 is provided with a brush 61 at an edge corresponding to the opening. By providing the brush 61, it is possible to prevent debris from being brought into the storage box 50 when the shutter 21 of the roller shutter assembly 20 enters and exits the storage box 50. Moreover, on a rainy day, through the blocking of the brush 61, the speed at which the accumulated water on the shutter 21 enters the storage box 50 can be controlled to ensure that the accumulated water in the storage box 50 can be discharged in time, thereby avoiding that the accumulated water in the storage box 50 overflows into the trunk of the vehicle.

Further, based on the above-mentioned embodiments, the electric lift gate further includes the ECU control module 70. One of the two side bars 10 is provided with two limit switches 12 spaced apart along the length direction. Each of the limit switches 12 and the driving assembly 40 are electrically connected to the ECU control module 70, respectively. When the roller shutter assembly 20 is wound or unwound in place, the limit switches 12 can be triggered. The ECU control module 70 controls the driving assembly 40 to stop driving according to signals fed back from the limit switches 12.

Figure 5:
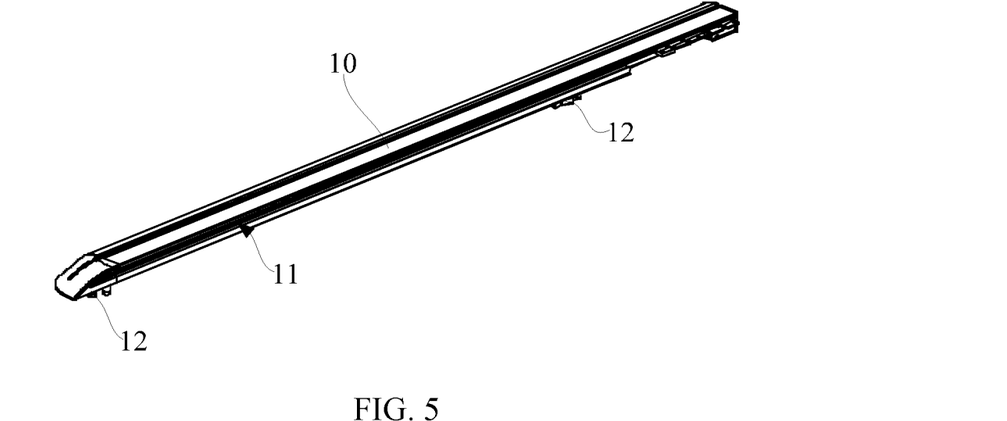
FIG. 5 is a schematic view of a side bar of the electric lift gate.

Specifically, the ECU control module 70 is used to control the operation of the entire electric lift gate. A user can remotely send instructions to the ECU control module 70 through remote control, and then, the ECU control module 70 controls the electric lift gate to automatically open and close. As shown in FIG. 5, the side bar 10 may include a bar body and end heads disposed at front and rear ends of the bar body. The bar body may be made of aluminum material, which has high structural strength. The limit switches 12 are disposed on the front and rear sides of the side bar 10 in the length direction, respectively. When the user sends an instruction for opening the electric lift gate through the remote control, the ECU control module 70 receives the instruction and controls the driving assembly 40 to operate. The driving assembly 40 drives the winding assembly 30 to rotate, which in turn can drive the roller shutter assembly 20 to move backwards along the guiding grooves 11 of the side bars 10 until the roller shutter assembly 20 comes in contact with the limit switch 12 disposed on the rear side, the limit switch 12 is then triggered. Then, the ECU control module 70 controls the driving assembly 40 to stop driving according to the signal, so that the roller shutter assembly 20 can be kept in the wound position to open the electric lift gate. Conversely, when the user sends an instruction to close the electric lift gate through the remote control, the ECU control module 70 can control the electric lift gate to automatically close. The ECU control module 70, the limit switches 12, and the driving assembly 40 cooperate with each other to ensure that the electric lift gate is opened or closed in place, further improving the reliability of the product.

Figure 12:
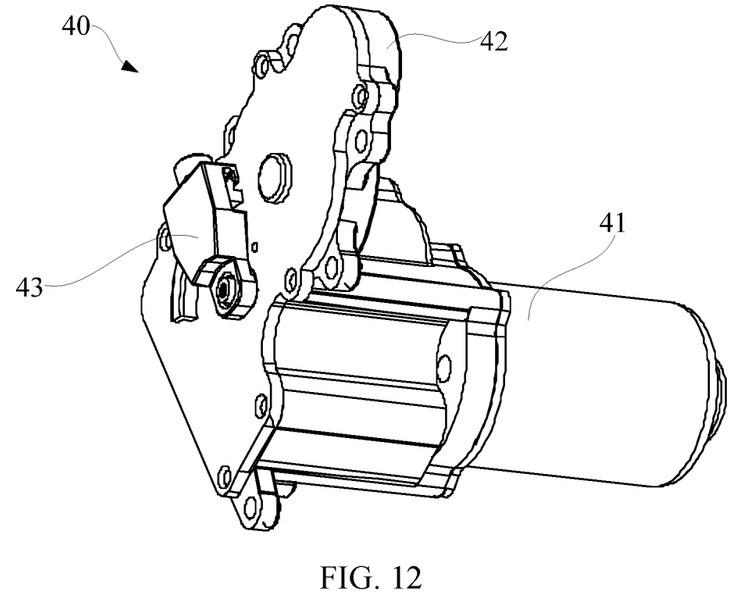
FIG. 12 is a schematic view of a driving assembly.

Further, referring to FIG. 12, in this embodiment, the driving assembly 40 includes a driving motor 41 and a decelerator 42. The driving motor 41 is connected to the winding assembly 30 through the decelerator 42. The decelerator 42 is provided with a clutch wrench 43. The clutch wrench 43 is used to control a clutch state of the decelerator 42. Torque output by the driving motor 41 is transmitted to the winding assembly 30 after being decelerated by the decelerator 42, thereby driving the roller shutter assembly 20 to move. The driving motor 41 can be a motor with Hall function. Specifically, the driving motor 41 can be a worm gear motor with Hall function. An output rotation speed of the motor can be set to 45 revolutions per minute, the maximum torque thereof is 15 N/m, and the noise thereof is less than 50 db. Due to self-locking characteristic of the worm gear motor, the roller shutter assembly 20 moves when the motor is in operation, and can maintain self-locking when the motor stops operating, so that the roller shutter assembly 20 can be accurately stopped at the corresponding position. When the vehicle is parked on a sloping road, a conventional electric lift gate cannot be stopped immediately due to the action of gravity, resulting in that the electric lift gate cannot be opened and closed in place. In this scheme, the driving motor 41 has the self-locking characteristic, which can ensure that the electric lift gate can be opened and closed in place. In addition, the self-locking force of the worm gear is large, which can lock the roller shutter assembly 20 well, thereby improving the anti-theft performance and ensuring the safety of the cargo in the trunk. In addition, since the driving motor 41 has the Hall function, 8 Hall signals are generated when the driving motor 41 rotates one turn. Every time one Hall signal is generated, the shutter 21 travels a predetermined distance, which may be 0.4 mm, for example. During the movement of the shutter 21, when resistance is encountered, the ECU control module 70 enables the driving motor 41 rotate reversely through the Hall stroke determination, so as to realize the anti-pinch function. Since the shutter 21 only moves 0.4 mm when the driving motor 41 generates one Hall signal, the driving motor 41 can achieve extremely sensitive anti-pinch function.

In addition, when a battery of the vehicle fails, the electric lift gate is in a power-off state, and the driving motor 41 cannot operate normally. At this time, the electric lift gate can be switched to a manual operation. Specifically, by pulling the clutch wrench 43, a clutch spring pin can be pressed, such that a gear inside the decelerator 42 can be misaligned, and the gear matched with the winding assembly 30 can be idling. In this way, the user can open or close the electric lift gate by manually pushing and pulling. When the clutch wrench 43 is turned in the opposite direction, the clutch spring pin is sprung out, and the gears inside the decelerator 42 are in a meshing state, which can realize power transmission. In this way, it is possible to realize the free switching between the manual scheme and the electric scheme, so as to avoid the problem that the electric lift gate cannot be opened or closed when being in the power-off state, which can further improve the reliability of the product.

The present disclosure also provides a vehicle. The vehicle includes an electric lift gate. For the specific structure of the electric lift gate, reference can be made to the above-mentioned embodiments. Since this vehicle adopts all the technical solutions of all the above-mentioned embodiments, the vehicle at least has all the beneficial effects brought by the technical solutions according to the above-mentioned embodiments, and which will not be repeated here.

The technical features of the embodiments as described above can be arbitrarily combined. In order to make the description concise, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

In the description of the present disclosure, it should be understood that orientation or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure.

In addition, the terms "first" and "second" are used for description only, and cannot be understood as indicating or implying relative importance or implicitly indicating the number of technical features described. Thus, the features defined with "first" and "second" may include at least one of the features explicitly or implicitly. In the description of the present disclosure, the meaning of "plurality" is at least two, such as two, three, etc., unless explicitly defined otherwise.

In the present disclosure, unless explicitly specified and limited otherwise, the terms "mounting", "connecting", "connected", "fixed" and the like should be understood in a broad sense. For example, it may be a fixed connection or a detachable connection, or an integration, may be a mechanical connection or electrical connection, may be a direct connection, or may be an indirect connection through an intermediate medium, may be the connection between two elements or the interaction relationship between two elements, unless explicitly defined otherwise. The specific meanings of the above terms in the present disclosure can be understood by one of those ordinary skills in the art according to specific circumstances.

In the present disclosure, unless explicitly specified and limited otherwise, the first feature being "on" or "below" the second feature may be that the first and second features are in a direct contact, or the first and second features are in an indirectly contact through an intermediate medium. Moreover, the first feature being "over", "above" and "on" the second feature may be that the first feature is directly above or obliquely above the second feature, or simply means that the first feature is higher than the second feature in horizontal direction. The first feature being "beneath", "under", and "below" the second feature may be that the first feature is directly below or obliquely below the second feature, or simply means that the first feature is lower than the second feature in horizontal direction.

It should be noted that when an element is referred to as being "fixed" or "disposed on" another element, it may be directly on another element or there may also be an intermediate element therebetween. When an element is considered to be "connected" to another element, it may be directly connected to another element or there may be an intermediate element therebetween. As used herein, the terms "vertical", "horizontal", "upper", "lower", "left", "right", and similar expressions are for illustration only and are not meant to be the only embodiments.

What is claimed is:

1. An electric lift gate, comprising:
opposing side bars having respective length directions and that are spaced apart, the side bars respectively include guiding grooves that respectively extend along the length directions;
a roller shutter assembly having opposing roller shutter assembly sides and being disposed between the side bars, the opposing roller shutter assembly sides being respectively slidably disposed in the guiding grooves;
a winding assembly cooperating with the roller shutter assembly in a driving manner;
a driving assembly connected to the winding assembly and being configured to rotate the winding assembly to cause the roller shutter assembly to wind or unwind; and
a storage box including opposing side plates that are spaced apart, wherein the side plates are respectively connected to the side bars,
wherein the winding assembly further includes a connecting rod having opposing connecting rod ends and rotating members respectively disposed at the connecting rod ends, the rotating members are respectively rotatably connected to the side plates, and the driving assembly is connected to at least one of the rotating members; and
wherein the winding assembly further includes a transmission gear connected to the connecting rod, the transmission gear is adapted to rotate synchronously with the connecting rod, and the roller shutter assembly includes shutters movably connected in sequence along the length directions of the side bars, each of the shutters includes a tooth portion meshing with the transmission gear.

2. The electric lift gate according to claim 1, wherein each of the connecting rod ends is sleeved with the transmission gear, the transmission gear is rigidly connected to the connecting rod, and wherein opposite end surfaces of the connecting rods respectively include inserting holes; and
wherein each of the rotating members includes a driving shaft connected to the driving assembly, a rotating shaft rotatably mounted on the side plate, a fixed disk abutting against an end surface of the transmission gear and being locked and fixed through fasteners, and an inserting portion disposed on a side of the fixed disk away from the rotating shaft and inserted into the inserting holes; and wherein the driving shaft and the fixed disk are respectively disposed at opposite ends of the rotating shaft.

3. The electric lift gate according to claim 1, further comprising an electronic control unit (ECU) control module, wherein at least one of the side bars includes limit switches spaced that are apart along the length direction of the side bar, each of the limit switches and the driving assembly are electrically connected to the control module, and wherein the limit switches are respectively capable of being triggered when the roller shutter assembly is wound or unwound, the control module is adapted to control the driving assembly to stop driving according to a signal fed back from the limit switches.

4. The electric lift gate according to claim 3, wherein the driving assembly includes a driving motor and a decelerator, the driving motor is connected to the winding assembly through the decelerator, the decelerator includes a clutch wrench that is configured to control a clutch state of the decelerator.

5. An electric lift gate, comprising:
opposing side bars that are spaced apart, the side bars respectively include guiding grooves that extend along respective length directions of the side bars;
a roller shutter assembly having opposing roller shutter assembly sides and being disposed between the side bars, the roller shutter assembly sides are respectively slidably disposed in the guiding grooves;
a winding assembly cooperating with the roller shutter assembly in a driving manner;
a driving assembly connected to the winding assembly and configured to drive the winding assembly to rotate to cause the roller shutter assembly to wind or unwind; and
a storage box including opposing side plates that are spaced apart, wherein the side plates are respectively connected to the side bars, the winding assembly includes a connecting rod having opposing connecting rod ends and rotating members respectively disposed on the connecting rod ends, the rotating members are respectively rotatably connected to the side plates and the driving assembly is connected to at least one of the rotating members;
wherein respective surfaces of the side plates are respectively provided with spiral grooves, and wherein respective ends of the spiral rooves are in respective communication with the guiding grooves, the roller shutter assembly is capable of spirally entering or exiting the storage box along the spiral grooves.

6. An electric lift gate, comprising:
opposing side bars that are spaced apart and having respective length directions, the side bars respectively include guiding grooves that respectively extend along the length directions;
a roller shutter assembly having opposing roller shutter assembly sides and being disposed between the side bars, the roller shutter assembly sides are respectively slidably disposed in the guiding grooves;
a winding assembly cooperating with the roller shutter assembly in a driving manner;
a driving assembly connected to the winding assembly and configured to drive the winding assembly to rotate to cause the roller shutter assembly to wind or unwind; and
a storage box including opposing side plates that are spaced apart, wherein the side plates are respectively connected to the side bars, the winding assembly includes a connecting rod having opposing connecting rod ends and rotating members respectively disposed at the connecting rod ends, the rotating members are respectively rotatably connected to the side plates, the driving assembly is connected to at least one of the rotating members;
wherein a top of the storage box is open, the electric lift gate further includes a cover plate disposed at an open end of the storage box, an opening for the roller shutter assembly to enter and exit is formed between the cover plate and the storage box.

7. The electric lift gate according to claim 6, wherein the cover plate includes a brush at an edge corresponding to the opening.

* * * * *